(12) United States Patent
Kienzle

(10) Patent No.: US 9,170,147 B2
(45) Date of Patent: Oct. 27, 2015

(54) PARABOLIC ANTENNA WITH AN INTEGRATED SUB REFLECTOR

(71) Applicant: Klaus Kienzle, Zell A.H. (DE)

(72) Inventor: Klaus Kienzle, Zell A.H. (DE)

(73) Assignee: VEGA GRIESHABER KG, Wolfach (DE)

( * ) Notice: Subject to any disclaimer, the term of this patent is extended or adjusted under 35 U.S.C. 154(b) by 409 days.

(21) Appl. No.: 13/761,416

(22) Filed: Feb. 7, 2013

(65) Prior Publication Data

US 2014/0182370 A1 Jul. 3, 2014

(30) Foreign Application Priority Data

Jan. 3, 2013 (EP) .................................... 13150192

(51) Int. Cl.
*G01F 15/00* (2006.01)
*G01F 23/28* (2006.01)
*G01F 23/284* (2006.01)
*H01Q 1/22* (2006.01)
*H01Q 1/42* (2006.01)
*H01Q 19/19* (2006.01)

(52) U.S. Cl.
CPC .............. *G01F 23/284* (2013.01); *H01Q 1/225* (2013.01); *H01Q 1/42* (2013.01); *H01Q 19/19* (2013.01)

(58) Field of Classification Search
None
See application file for complete search history.

(56) References Cited

U.S. PATENT DOCUMENTS

| 4,146,869 | A | * | 3/1979 | Snyder | 367/99 |
|---|---|---|---|---|---|
| 4,232,322 | A | * | 11/1980 | De Padova et al. | 343/781 P |
| 4,581,615 | A | | 4/1986 | Levy | |
| 6,020,859 | A | * | 2/2000 | Kildal | 343/781 CA |
| 7,345,622 | B2 | * | 3/2008 | Edvardsson | 342/124 |
| 7,612,735 | B2 | * | 11/2009 | Essig et al. | 343/915 |
| 7,898,497 | B2 | * | 3/2011 | Syed et al. | 343/882 |
| 2003/0184486 | A1 | * | 10/2003 | Shafai et al. | 343/779 |
| 2011/0309987 | A1 | * | 12/2011 | Haluba et al. | 343/755 |
| 2013/0021214 | A1 | * | 1/2013 | Zimmerman et al. | 343/761 |
| 2014/0368408 | A1 | * | 12/2014 | Tuau et al. | 343/914 |

FOREIGN PATENT DOCUMENTS

| DE | 28 42 298 | 5/1980 |
|---|---|---|
| DE | 10 2005 049 242 | 4/2007 |
| DE | 10 2007 061 571 | 7/2009 |
| DE | 10 2009 000 733 | 8/2010 |
| WO | WO 03/090384 | 10/2003 |

OTHER PUBLICATIONS

EP 13 150 192.6, Search Report issued by the EP Apr. 8, 2013, 6 pages—German; 3 pages—English.

* cited by examiner

*Primary Examiner* — Peter Macchiarolo
*Assistant Examiner* — Jermaine Jenkins
(74) *Attorney, Agent, or Firm* — Andrew F. Young, Esq.; Lackenbach Siegel, LLP

(57) ABSTRACT

A sensor for a fill level measuring device for determining the fill level in a container by determining the delay time of high-frequency signals, comprising a main reflector having an edge region and an inner region, a sub reflector, which is connected to the edge region of the main reflector via a radome, an inner space, which is encompassed by the radome and the main reflector, and a hollow waveguide which is connected to the main reflector and has a front end, which is oriented toward the sub reflector for coupling electromagnetic waves in and/or out, wherein the radome and the sub reflector are embodied as integral or unitary in formation.

14 Claims, 3 Drawing Sheets

PARABOLIC ANTENNA WITH AN INTEGRATED SUB REFLECTOR

CROSS REFERENCE TO RELATED APPLICATION

This application claims priority from, and relates to European Ser. No. 13 150 192.6 filed Jan. 3, 2013, the entire contents of which are incorporated herein fully by reference.

FIGURE FOR PUBLICATION

FIG. 1

BACKGROUND OF THE INVENTION

1. Field of the Invention

The present invention relates to a sensor for measuring the fill level in a container. More particularly, the present invention provides a parabolic antenna with a sub reflector integrated into the radome.

2. Description of the Related Art

Sensors designed for measuring the fill level in a container that is filled with a liquid or with bulk material by determining the delay time of high-frequency signals are known in the art, wherein the sensor is embodied as a parabolic antenna which comprises a main reflector, a sub reflector, and a hollow waveguide, which is connected to the main reflector and which is oriented with its front end toward the sub reflector for coupling electromagnetic waves in and/or out.

Parabolic antennas embodied as sensors can therefore be used for measuring the fill level of liquids or for measuring the fill level of bulk material or for determining the level of liquids or bulk material. Sensors of this type are frequently required to withstand high pressures or high temperatures, and frequently are used in environments that contain aggressive media. To protect their components against corrosion and destruction, most such sensors are therefore equipped with a protective shell or a radome.

In the measurement of fill levels by determining delay times of high-frequency signals, high-frequency pulses are transmitted via an antenna and are reflected on the surface of a medium. The reflected high-frequency pulses are then received by the sensor. From the time difference between transmission of the high-frequency pulse and reception of the reflected high-frequency pulse, the distance of the sensor from the surface of the respective medium can be determined. Fill level measuring devices embodied as parabolic antennas for monitoring and determining fill levels in a container are known in the prior art.

DE 10 2009 000 733, for example, the entire contents of which are incorporated herein by reference, discloses a fill level measuring device, which has a special temperature and a hermetic seal that is stable under pressure. In this case, a process separation unit is proposed, which is equipped at least with a radiation structure that is transparent to high-frequency signals, a retention clip, and a coupling sleeve, wherein the radiation structure encompasses the hollow waveguide flush in a predefined region on the exterior side of the hollow waveguide, and wherein a radial enclosure of the region of the radiation structure that encompasses the hollow waveguide is embodied as a mounted coupling sleeve. The radiation structure is thereby pressed in a positive connection against the exterior of the hollow waveguide, forming a tight seal, and the metallic retention clip is preferably attached to the metallic sub reflector and to the mounted metallic coupling sleeve. However, part of the electromagnetic wave exiting the waveguide is reflected and deflected by this retention clip, so that the emitted electromagnetic radiation field is disrupted. However, during measurement, such undesirable reflections lead to an objectionable reduction in the signal-to-noise ratio, which can in some cases be substantial, and which can cause the echo to disappear into noise, making measurement of the fill level impossible.

DE 10 2005 049 242, for example, the entire contents of which are also incorporated herein by reference, attempts to solve this problem by employing a diffusion disk for removing the interfering portion of the electromagnetic waves laterally, past the exciter. In this process, the electromagnetic waves transmitted by the exciter are concentrated only partly by the parabolic mirror and radiated to the bulk material. The other part of the electromagnetic waves transmitted by the exciter is not concentrated, and is instead removed laterally by the diffusion disk. In this manner, the signal-to-noise ratio can be improved particularly in the short range, and the quality and sensitivity of measurement can be increased. The diffusion disk is arranged at the center of the parabolic mirror. In the embodiment examples of DE 10 2005 049 242, the exciter is coupled directly to the hollow waveguide and securely connected thereto, and is optionally protected by a radome. However, this device has the disadvantage that, on one hand, only part of the electromagnetic radiation is available for measuring the fill level, and on the other hand, by mounting the exciter with the hollow waveguide, additional interference with the electromagnetic field can occur.

The present invention therefore addresses the problem of providing a sensor for a fill level measuring device, which has no elements that interfere with the antenna array of the sensor, but which at the same time is easy to handle.

Accordingly, there is a need for an improved sensor, method of providing a sensor and a desire to overcome at least one of the detriments noted above.

ASPECTS AND SUMMARY OF THE INVENTION

In response, it is now recognized that the proposed invention addresses one of the desires noted herein.

According to one aspect of the present invention, a sensor for a fill level measuring device for determining the fill level in a container by determining the delay time of high-frequency signals comprises a main reflector having an edge region and an interior region, a sub reflector, which is connected to the edge region of the main reflector via a radome, an inner space, which is encompassed by the radome and the main reflector, and a hollow waveguide which is connected to the main reflector and has a front end, which is oriented toward the sub reflector for coupling electromagnetic waves in and/or out. The radome can be connected to the sub reflector via adhesive bonding or screws. Preferably, however, the radome is provided and embodied as integral with, or unitary, or monolithic with the sub reflector. Consequently, the previously customary attachment of the sub reflector can be dispensed with. And as a result, the active antenna surface is enlarged, and the efficiency of the radiated power is increased, since the antenna array of the detector can no longer be interfered with by projecting connectors. This advantage has an impact particularly at higher frequencies, for example, in the range between 77 and 81 GHz, that is, in a range in which the retaining connectors or other attachments become quite large in proportion to the wavelength.

The sub reflector and the radome are preferably made of a first dielectric material, wherein the part of the dielectric material that forms the sub reflector has a reflective coating, preferably a metal coating, on its side that faces the inner space. This allows the radome and the sub reflector to be produced together in a simple process, and allows a modular structure for the sensor. The space inside the sensor is preferably sealed, pressure-tight and/or vacuum-tight, in relation to an outer space that surrounds the sensor, so that corrosive vapors from liquids, the fill level of which is to be determined, cannot damage the sensor, and bulk material cannot soil the sensor.

The edge region of the main reflector can be embodied as a collar which encompasses the inner region, and which is preferably embodied as a tubular collar that encompasses the inner region and projects in the direction of radiation. The beam direction of the sensor can thereby be improved. The radome can also have a collar that is embodied such that the radome can be screwed onto, screwed into, or operatively fit onto the collar of the main reflector in a positive and operative connection. For this purpose, the collar of the main reflector can have a corresponding threading, onto which the radome can be screwed, or into which the radome can be screwed. A secure mounting of the radome onto the main reflector can thereby be guaranteed.

To accomplish sealing of the inner space in relation to the outer space, the edge region of the main reflector can have a sealing surface for providing a sealed connection between the radome and the main reflector. For this purpose, optionally as a sealing means but not limited thereto, at least one O-ring can be provided between the edge region of the main reflector and the radome for the purpose of sealing the inner space in relation to the outer space.

The main reflector of the sensor can be embodied as parabolic or paraboloid, and it can either be made of a metal or can have a metal coating on the inner region of its side that faces the inner space. High efficacy of the radiated power can thereby be achieved. The sub reflector can be elliptical or hyperbolic in shape. It conducts the power radiated from the hollow waveguide to the main reflector and thereby ensures the desired radiation. Advantageously, the sensor is embodied as a Cassegrain antenna or as a Gregory antenna, and it is understood that those of skill in the particular art will recognize these phrases as being fully enabling based upon the skill in the art. The sub reflector can be embodied as concave according to the Gregory principle, or it can be embodied as convex according to the Cassegrain principle.

To increase mechanical stability, the radome is advantageously embodied as convex and/or conical, but is not limited to these sole geometric shapes. The radome can be made of a plastic, for example, but may be pursued of any other operatively advantageous material. Advantageously, it is made of polypropylene (PP) or polytetrafluoroethylene (PTFE). These materials are characterized by a dielectric constant that is suitable for the W-band range, and absorb the transmitted radiation only weakly. On the other hand, however, the materials are not entirely optimal with respect to temperature resistance and expansion, and therefore can be used only conditionally for determining fill level, for example, in pressure less or low-pressure applications and/or at temperatures that are not excessively high. In environments in which the sensor is exposed to high pressures, or in environments in which it must have a particularly high stability, the radome is advantageously made of a glass fiber reinforced plastic or a high-performance plastic. Materials that are particularly suitable as plastic materials in these cases include polyetherether ketone (PEEK) and polyether imides (PEI).

In one further adaptive and advantageous embodiment, the thickness of the radome is such that it corresponds to a whole-number multiple of half the dielectric wavelength of a coupled-in electromagnetic wave, wherein the wavelength preferably corresponds to a wavelength of the W-band, particularly preferably to a wavelength of between 77 GHz and 81 GHz. Interfering reflections back to the surfaces of the radome are thereby avoided.

The front end of the hollow waveguide can be embodied as horn-shaped, and it can preferably be filled with a second solid dielectric material. In this manner, the wave impedance of the hollow waveguide can be adapted to the wave impedance of the open space.

The inner space can be filled with a third, preferably solid dielectric material. The sensor is thereby made stable to pressure, and the diameter of the hollow waveguide can be chosen as smaller. The dielectric constants of the first, second and third materials may be, but are not required to be, equal.

Of course, the front end of the hollow waveguide can also be embodied as a hollow waveguide that projects into the inner space, and is open in the direction of the sub reflector if, for example, the entire radiated energy is to be effectively deflected to the main reflector via the sub reflector. The sensor can be used in a fill level measuring device for detecting the fill level in a container by determining the delay time of high-frequency signals for radiating and receiving electromagnetic radiation.

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
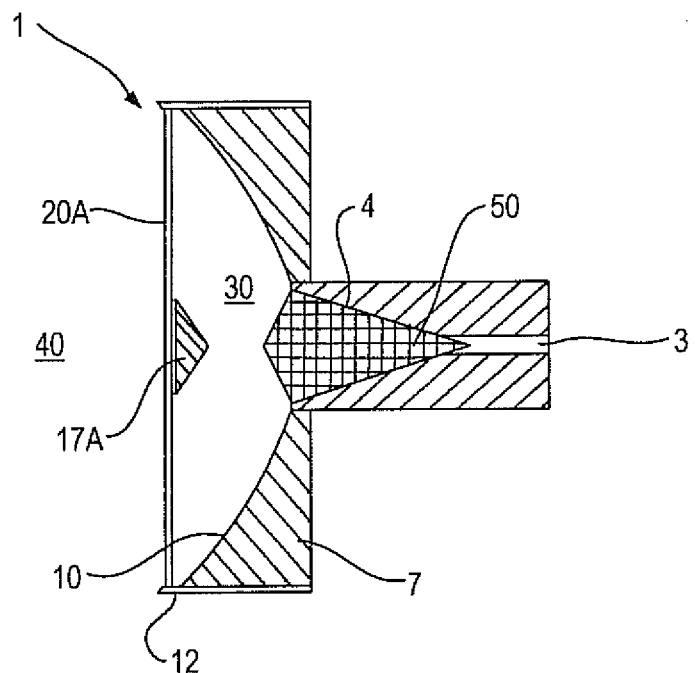
FIG. 1 is an illustrative side sectional view of a sensor in a first optional embodiment, with a flat radome and a hollow waveguide end piece which is expanded in the shape of a horn.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various elements, steps, features, or operations may be described as multiple discrete details in turn, and in a manner that may be helpful in understanding embodiments of the present invention; however, the order of description will not be construed to imply that these elements, steps, features or operations are order dependent.

FIG. 1 shows a schematic sectional illustration of one optional sensor 1 with a hollow waveguide 3, the front end 4 of which is extended in the shape of a horn, but is not limited thereto, and is filled with a dielectric material. The front end 4 of the hollow waveguide 3 is connected to a main reflector 7. An inner region 10 that forms the front surface of the main reflector 7 is bordered by an edge region 12 of the main reflector. The inner region 10 has a surface that is reflective to electromagnetic radiation, and is preferably metallic. A sub reflector 17A located opposite the front end 4 of the hollow waveguide is connected to the edge region 12 of the main reflector 7 via a radome 20A made of dielectric material. On its side that faces the hollow waveguide end piece 4, the sub reflector 17 at least has a metallic coating or is made entirely of metal. The radome 20A is connected to the sub reflector 17A, supporting the reflector, either via a screw connection or an adhesive connection, or is advantageously embodied as integral with said reflector. The main reflector 7, with the radome 20A and the sub reflector 17A, encompasses an inner space 30, which is hermetically sealed in relation to the exterior space 40 that surrounds the sensor 1, for example by means of O-rings 43, 46 arranged between edge region 12 and radome 20F as discussed in relation to FIG. 6. It will be understood that the sealing means is operatively effective to encompass inner space 30 as will be discussed further below.

Figure 5:
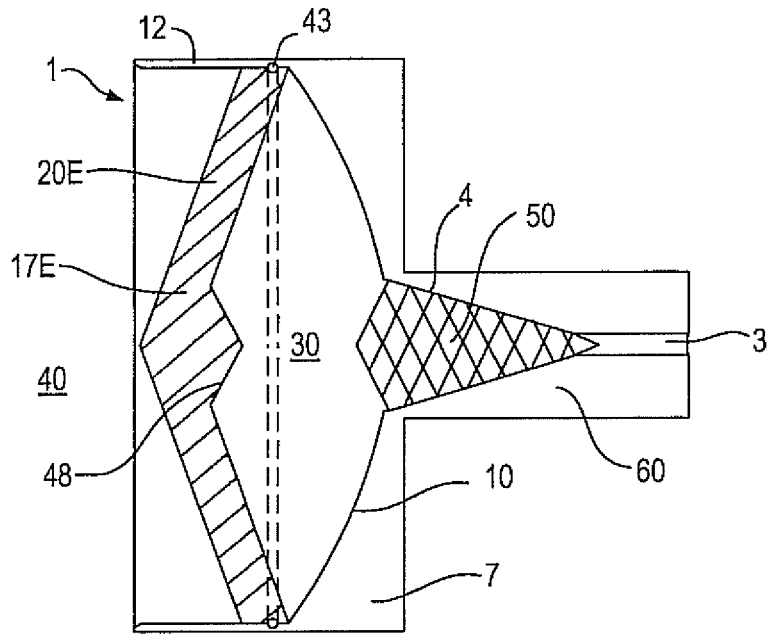
FIG. 5 is a further illustrative view from the side of a vacuum-tight sensor with an O-ring seal arranged radially between radome and edge region of the main reflector.

As is illustrated by way of example in FIG. 5, such a seal can be implemented by an O-ring 43 arranged radially between edge region 12 and radome 20. In FIG. 5, the sub reflector 17E is embodied as integral with the radome 20E and is equipped with a metal coating 48. Here, radome 20E in FIG. 5 is made of a first dielectric material. The hollow waveguide end piece 4 extended in the shape of a horn is filled with a second dielectric material 50, as shown in FIG. 1.

Figure 6:
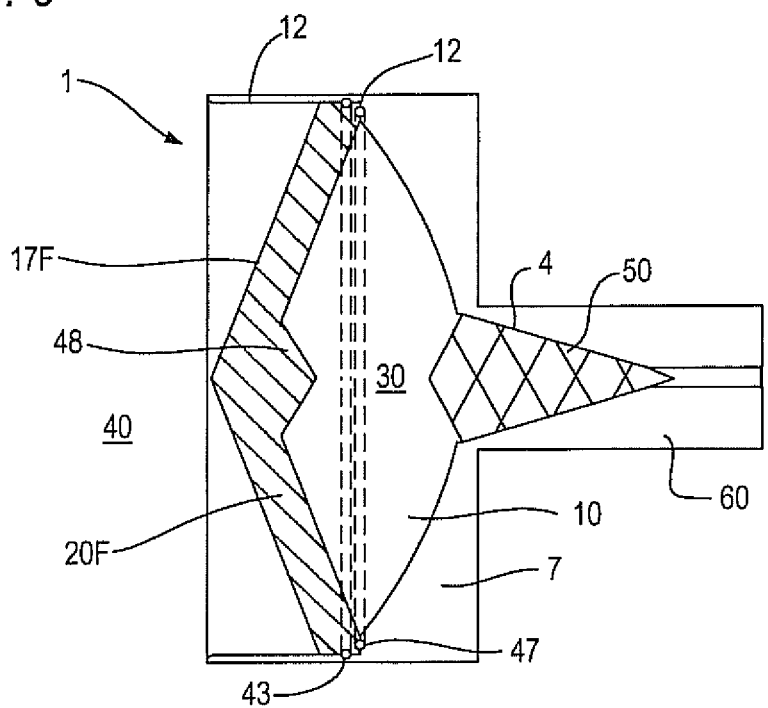
FIG. 6 is a pressure-tight embodiment of the sensor having one O-ring seal arranged axially and one O-ring seal arranged radially between radome and the edge region of the main reflector.

FIG. 6 shows a further possibility for sealing the inner space 30 from the outer space 40. In this example, the edge region 12 of the main reflector is embodied as forming an L-shape around its inner region. The part of the edge region 12 that is directly adjacent to the inner region provides an additional sealing surface for sealing the inner space 30 in relation to the outer space 40. In FIG. 6, sealing is accomplished with an O-ring 43 that surrounds the radome 20F radially and sub reflector 17F, as was already illustrated in reference to FIG. 5, and with an O-ring 47 arranged axially between radome 20F and edge region 12, and surrounding the inner region 10 of the main reflector 7. Of course, sealing arrangements are also conceivable in which, for example, sealing is accomplished only by means of one axially arranged O-ring 47.

To attach the radome 20 (namely any radome 20A-20F embodiment discussed herein or otherwise) to the main reflector 7, and to simultaneously seal the inner space 30 in relation to the outer space 40, the radome can be operatively screwed into a main reflector 7 embodied according to FIG. 6, for example, by means of screw threading (not shown), if the edge region 12 embodied as an L-shaped collar has a continuous indentation at its front end, for example, or a corresponding mating thread. In this operative case, for example, sealing can be accomplished solely via the O-ring 47 that surrounds the inner region 10 of the main reflector 7 axially. Here, it is necessary for the edge of the radome 20F only to be shaped such that the radome rests flat against the O-ring 47 when it is screwed into the main reflector. Of course, other operative sealing means may be used without departing from the scope and spirit of the present invention.

As will be understood by those of skill in the art, in each of the FIGS. 1, 2, 5 and 6, the front end 4 of the hollow waveguide 3 is embodied in the shape of a horn, and is optionally and operatively filled with a solid dielectric material, with which the inner space 30 can also be sealed in relation to the interior of the waveguide 3.

Figure 3:
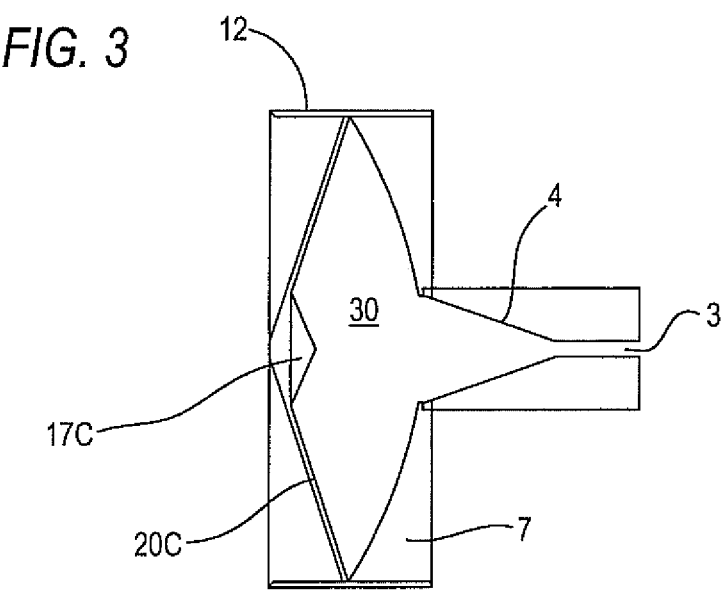
FIG. 3 is a further illustrative third embodiment of the sensor with a collar piece drawn toward the front side thereof.

FIG. 3, in contrast, shows a sensor 1 with a hollow waveguide end piece 4 embodied in the shape of a horn, which is not filled with a solid dielectric material. In this example, the inner space 30 also extends into the interior of the hollow waveguide 3. In these cases, the inner space 30 can optionally be sealed in relation to the outer space 40, for example, on the connection piece of the hollow waveguide 3 on the signal emitter side.

Figure 2:
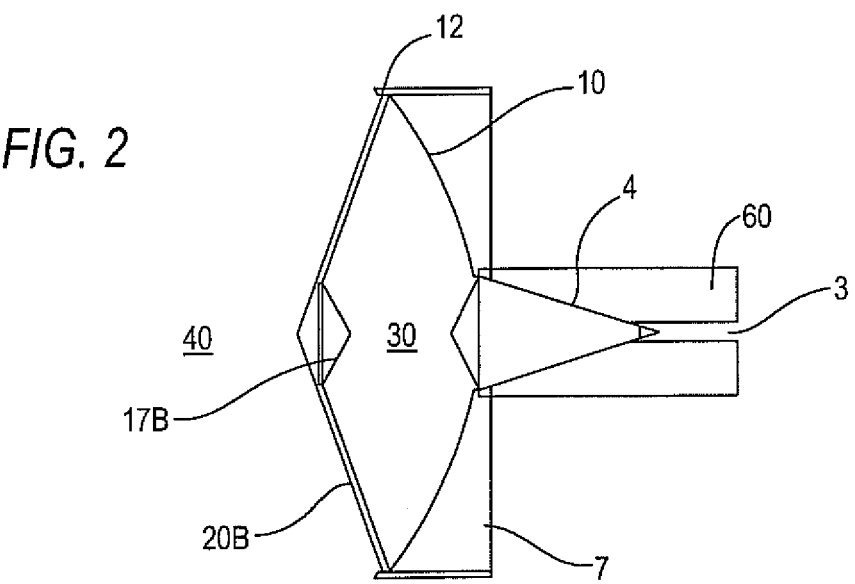
FIG. 2 is an illustrative alternative embodiment of the sensor with a conical radome.

Whereas, in FIG. 1, the radome 20A is embodied as planar or flat, FIGS. 2 to 6 show alternatively shaped (here convex) radomes 20B, 20C, 20D, 20E, and 20F (all as shown), which can be conical in shape, for example. Operatively, those of skill in the art will recognize that a radome 20 embodied as such has greater mechanical stability than the flat variant. The front end 4 of the hollow waveguide 3 in FIGS. 2 and 3 is expanded in the shape of a funnel or horn such that the wave impedance of the hollow waveguide is adapted to the inner space 30. The inner space 30 can be filled with a solid, liquid or gaseous dielectric material, or can be empty, all without limitation to the present invention. The wall 60 of the hollow waveguide 3, 4 can be embodied as a support, made of metal, for example, and can mechanically support the reflector 7 with the sub reflector 17 and the radome 20. To the extent that the inner wall of the hollow waveguide 3 is optionally metalized, the wall 60 can also be made of a non-metallic material. This discussion is provided to illustrate that those of skill in the art will recognize that variations may be provided without departing from the scope and spirit of the present invention.

FIG. 3 and FIGS. 4-6 show further exemplary embodiments of a sensor for a fill level measuring device for determining the fill level in a container. In this example, the edge region 12 of the main reflector is arranged in a generally tubular shape around the inner region 10 (the images are cross-sectionally shown). Such an arrangement can be provided, for example, as added mechanical protection for the radome and can stabilize the sensor.

The edge region 12 of the main reflector 7 is preferably made of metal, or preferably has a metallic coating, so that the radiation reflected by the surface of the liquid or by the surface of the bulk material, which would strike the sensor at an angle, cannot return to the hollow waveguide. In this manner, interferences in determining the delay time of the signal can be avoided.

Figure 4:
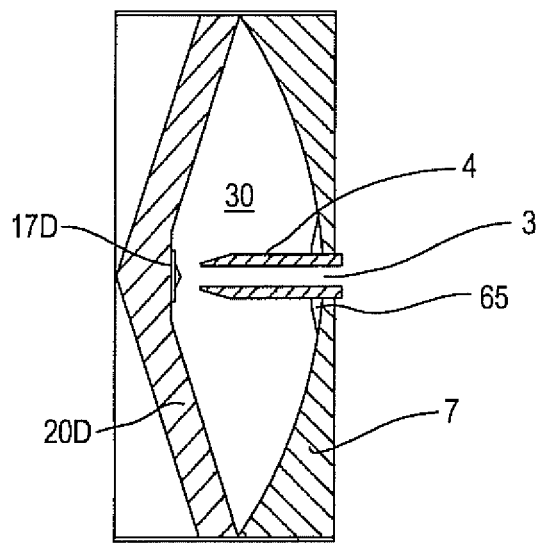
FIG. 4 is a further illustrative embodiment of the sensor with a hollow waveguide that projects into the inner space.

In FIG. 4, the end piece 4 of the hollow waveguide 3 is inserted into the inner space 30 in the direction of the sub reflector 17 (as shown). The end piece can be open or can be filled with a dielectric material (optionally). Operatively, a diffusion disk 65 ensures that the interfering portions of the electromagnetic waves reflected by the sub reflector to the main reflector can no longer be deflected back to the sub reflector, and therefore cannot be coupled back into the hollow waveguide. The thickness of the radome 20D in FIG. 6 is such that it corresponds to a whole number multiple of one-half its dielectric wavelength, for example, 2 to 10 times one-half its dielectric wavelength, or equal to one-half its dielectric wavelength. In this manner, the part of the reflection from the surface of the radome that faces the inner space 30 back to the hollow waveguide is minimized. The use of a thicker radome, as is indicated schematically in FIGS. 4 to 6, also increases the overall stability of the sensor to pressure, so that it can also be used in environments in which high mechanical stress on the sensor can occur.

The measurement method of determining a fill level using a sensor of the type described for determining the fill level in a container by determining the delay time of high-frequency signals is carried out as follows:

A signal source (not shown but understood by those of skill in the art) couples an electromagnetic wave into the hollow waveguide 3. The electromagnetic signal is conducted through the hollow waveguide 3 toward the front end 4, and in the inner space 30 is radiated toward the sub reflector 17 (e.g., sub reflectors 17A-17F for corresponding radomes 20A-20F). The sub reflectors 17 reflects the signal to the inner region of the main reflector 7, such that said reflector sends the signal as an ideally parallel high-frequency burst, perpendicular to the surface of the liquid, or to the surface of the bulk material. The radome 20 is made of a dielectric material, and is operatively structured and arranged such that it interferes as little as possible with the electromagnetic signals radiated from the main reflector. The part of the electromagnetic signal which is reflected by the surface of the liquid or by the surface of the bulk material toward the sensor 1, and which strikes the inner region 10 of the main reflector 7, is reflected by the main reflector 7 to the sub reflector 17, and is coupled by this into the front end 4 of the hollow waveguide 3. In operation, the reflected signal is detected by a receiving unit, not specified in greater detail, and from the delay time of the signal, the distance between the sensor and the bulk material surface is determined. Customary methods are available for determining the delay time include the pulse delay method (pulse radar) or the FMCW radar method (frequency modulated continuous wave radar) within the skill in the art and such understanding is incorporated herein by reference.

The invention has been specified in greater detail in reference to preferred embodiment examples, without being restricted to these embodiment examples. The features of individual embodiment examples can be freely combined or exchanged with features of other embodiment examples, assuming they are compatible.

LIST OF REFERENCE SIGNS

1 sensor
3 hollow waveguide
4 front end of hollow waveguide
7 main reflector
10 inner region
12 edge region
17 sub reflector (17A to 17F)
20 radome (20A to 20F)
30 inner space
40 outer space
43 O-ring
47 O-ring
48 metal coating
50 second dielectric material
60 hollow waveguide wall
65 diffusion disk It will be understood by those of skill in the art that the illustrative designations used herein, such as top, bottom, left and right, etc., are in no way intended as restrictive, even where they refer to preferred embodiments. For example, the term "leak-proof" is illustrative but means that in the case of a pressure difference of at least 100 mbar, no leakage will occur. The term "vacuum-tight" means that, at a pressure difference of up to one bar, no leakage will occur. The term "pressure-tight" is understood to mean that the sensor can be used in environments having an external pressure of at least 3 bar, and that the flexure of the radome at room temperature is less than 0.3 mm. As a result, these phrases are recognized and will be understood by those of suitable skill in the operative arts. It will also be understood, that as discussed here in where radome and sub reflector are noted as integral, this shall be understood to be operatively integrated into a unitary, monolithic, or operatively contiguous and continuous member effective to operate as discussed herein.

As another adaptive embodiment, and optionally without restriction thereto, it will be understood that a pressure-tight sensor as discussed herein can be used at an external pressure of at least 10 bar.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents. For a non-limiting example, while the description describes the system or apparatus details herein, the entire disclosure shall also be recognized as fully supporting a method of assembling or using the invention, as well as a method of operatively using the proposed invention without departing from the scope and spirit of the present invention.

What is claimed is:

1. A sensor, for a fill level measuring device for determining the fill level in a container by determining the delay time of high-frequency signals, comprising:
    a main reflector having an edge region and an inner region;
    a sub reflector, operatively connected to the edge region of the main reflector via a radome;
    an inner space encompassed by the radome and the main reflector; and
    a hollow waveguide which is operatively positioned and connected to the main reflector and has a front end, said front end being oriented toward the sub reflector for coupling electromagnetic waves thereto;
    the radome and the sub reflector are embodied being integral with each other; and
    the front end of the hollow waveguide is embodied in the shape of a horn, and preferably is filled with a second solid dielectric material.

2. The sensor, according to claim 1, wherein:
    the sub reflector and the radome are made of a first dielectric material; and
    said dielectric material that makes up the sub reflector has a metal coating on a side that faces the inner space.

3. The sensor, according to claim 1, wherein:
    the inner space is sealed, pressure-tight and vacuum-tight, from an outer space that surrounds the sensor.

4. The sensor, according to claim 1, wherein:
    the edge region of the main reflector is embodied as a collar which encompasses the inner region; and
    said collar is a tubular collar that encompasses the inner region and projects in the direction of radiation.

5. The sensor, according to claim 1, wherein:
the edge region of the main reflector has a sealing surface and is in an operatively leak-proof connection between the radome and the main reflector.

6. The sensor, according to claim 5, further comprising:
at least one O-ring between the edge region of the main reflector and the radome; and
said O-ring operatively positioned for sealing the inner space in relation to the outer space that surrounds the sensor.

7. The sensor, according to claim 1, wherein:
the main reflector is embodied as paraboloid, and is either made of a metal or has a metal coating on an inner region side that faces the inner space.

8. The sensor, according to claim 1, wherein:
the sub reflector is elliptical or hyperbolic in shape.

9. The sensor, according to claim 1, wherein:
the sensor is embodied as a Gregory antenna or a Cassegrain antenna.

10. The sensor, according to claim 1, wherein:
the radome is made of a plastic, preferably one of PP and PTFE.

11. The sensor, according to claim 1, wherein:
the radome is made of one of a glass fiber reinforced plastic and a high-performance plastic; and said high-performing plastic being one of PEEK and PEI.

12. The sensor, according to claim 1, wherein:
the radome is embodied as convex or conical.

13. The sensor, according to claim 1, wherein:
the thickness of the radome is such that it corresponds to a whole-number multiple of one-half the dielectric wavelength of a coupled-in electromagnetic wave, wherein the wavelength preferably corresponds to a wavelength of the W-band, particularly preferably a wavelength of between 77 GHz and 81 GHz.

14. A method, for measuring a fill level in a container, comprising the steps of:
providing a sensor operative for determining the fill level in the container by determining a delay time of high-frequency signals and for radiating and receiving electromagnetic radiation;
said sensor further comprising
a main reflector having an edge region and an inner region;
a sub reflector, operatively connected to the edge region of the main reflector via a radome;
an inner space encompassed by the radome and the main reflector; and
a hollow waveguide which is operatively positioned and connected to the main reflector and has a front end, said front end being oriented toward the sub reflector for coupling electromagnetic waves thereto;
the radome and the sub reflector are embodied being integral with each other; and
the front end of the hollow waveguide is embodied in the shape of a horn, and preferably is filled with a second solid dielectric material.

* * * * *